United States Patent [19]

Tarabella

[11] Patent Number: 5,796,945
[45] Date of Patent: Aug. 18, 1998

[54] IDLE TIME MULTIMEDIA VIEWER METHOD AND APPARATUS FOR COLLECTING AND DISPLAYING INFORMATION ACCORDING TO USER DEFINED INDICIA

[76] Inventor: Robert M. Tarabella, 824 Wood Hollow Dr., Marietta, Ga. 30067

[21] Appl. No.: 478,105

[22] Filed: Jun. 7, 1995

[51] Int. Cl.$^6$ .................................................. G06F 17/30
[52] U.S. Cl. ........................ 395/200.9; 395/326; 395/761
[58] Field of Search ............................... 395/155, 154, 395/100, 153, 159, 160, 161, 200.09, 327, 326, 333, 335, 761, 806, 807, 788

[56] References Cited

U.S. PATENT DOCUMENTS

| | | | |
|---|---|---|---|
| 4,519,029 | 5/1985 | Thompson | 364/200 |
| 4,722,005 | 1/1988 | Ledenbach | 358/168 |
| 4,814,972 | 3/1989 | Winter et al. | 364/200 |
| 4,974,149 | 11/1990 | Valenti | 395/800 |
| 5,105,184 | 4/1992 | Pirani et al. | 340/721 |
| 5,347,632 | 9/1994 | Filepp et al. | 395/200 |
| 5,379,383 | 1/1995 | Yunoki | 395/325 |
| 5,448,262 | 9/1995 | Lee et al. | 345/212 |
| 5,491,820 | 2/1996 | Belove et al. | 395/600 |
| 5,493,677 | 2/1996 | Balogh et al. | 395/600 |
| 5,517,605 | 5/1996 | Wolf | 395/155 |
| 5,559,868 | 9/1996 | Blonder | 379/96 |
| 5,579,471 | 11/1996 | Barber et al. | 395/326 |
| 5,579,537 | 11/1996 | Takahisa | 455/66 |

FOREIGN PATENT DOCUMENTS 0206565  12/1986  European Pat. Off. .

OTHER PUBLICATIONS

Grotta "PhotoGenix creates screen-saver slide shows", PC Magazies v13 n16 p. 52, Sep. 27, 1994.

Rohan "In Your Face makes you a star", Computer Shopper v14 n5 p. 767, May 1994.

Morgenstern, "Farcast service broadcasts instanst info via the Internet", PC Week v11 n34 p. 50, Aug. 29, 1994.

Rodriguez "Individual to tap Internet with an agent-based new service", InfoWorld v16 n43 p. 58, Oct. 24, 1994.

Kransoff "Microsoft Scenes screen saver bring culture to your desktop", Computer Shopper v14 n2 p. 508, Feb. 1994.

McKenna "Comdex –Moon Valley's NetCruiser CD and more" Nesbytes, Nov. 16, 1994.

More After Dark, Berkeley Systems, Inc., 1991.

*Primary Examiner*—Dinh C. Dung
*Attorney, Agent, or Firm*—Kennedy, Davis & Kennedy

[57] ABSTRACT

An apparatus for collecting a series of image collections for display on a video terminal at a user-selected time and sequence, with the series of image collections selected according to a user-defined indicia of images to collect. The apparatus includes means for generating a set of indicia used to select and create sets of image collections for subsequent display on a video terminal at a user-selected time and sequence; means for collecting sets of image collections based on the set of indicia; and means for displaying representative portions of each of the sets of image collections on the video terminal. Means are provided for displaying the sets of image collections.

24 Claims, 6 Drawing Sheets

IDLE TIME MULTIMEDIA VIEWER METHOD AND APPARATUS FOR COLLECTING AND DISPLAYING INFORMATION ACCORDING TO USER DEFINED INDICIA

TECHNICAL FIELD

The present invention relates to microprocessor-driven displays on video terminals. More particularly, the present invention relates to apparatus that collect images of selected subject matters and display the collected images on video terminals.

BACKGROUND OF THE INVENTION

For many years, video information has been presented on video display terminals which typically having cathode ray tube technologies, although other display technologies have been developed. Common usage of such displays has been in television sets for displaying television signals broadcast by television stations or carried on cable. As computerized information processing technology developed, video display technology embodied in video display terminals was used to display information from mainframe computers. Video display terminals thereafter were readily used with microprocessors in what is commonly known as personal computers.

Video display terminals sometime experienced a problem known "burn-in". Burn-in occurred when a particular image was displayed for long periods of time; for example, a computer terminal displaying a coded grid for use in data entry of informational. The burn-in problem became more prominent with the advent of microprocessor-based game devices that often used televisions for video display of games. The burn-in problem arose because children and others playing the games would play for long period of time or leave the game on after play. The game board image would thereby be displayed for long periods of time, and the image became fixed in the phosphor screen of the television and was visible even after switching the game and the television off. To avoid this problem, game devices implemented strategies of shifting the displayed image and/or its colors or pattern during periods that the game was on but not being played.

After the widespread adoption and use of microprocessor computers for business and personal use, various techniques were developed to prevent inadvertent burn-in on the video terminal display. These generally involved the computer sensing non-use of the computer for a pre-determined period and then reducing the intensity of the displayed image. In other computers, the screen was refreshed to a blank screen or darkened. As this problem became more known, terminal manufacturers included circuitry to prevent the terminal from continuous display of an image.

However, the burn-in problem gave rise to development of software computer programs known as "screen savers" for preventing burn-in. These screen saver programs generally operated in the background of the computer and sensed periods of non-use of the computer. After pre-determined intervals, the programs would overwrite the screen in order to change the display. The overwriting typically involved clearing the screen to a blank image, display of patterns on the screen, display of moving messages, display of images, and the like.

In either the hardware or software mechanisms for preventing burn-in, a period of non-use or inactivity of the computer triggers the protection mechanism. Often such periods occur as a result of the computer user becoming occupied in other work or engaging in telephone conferences without accessing or using the computer. The protection mechanism responds accordingly and triggers the screen saver display of idle messages or images.

While the screen savers in use today meet at least a perceived need to prevent burn-in by the display of random images during idle time of a computer, there is no mechanism for making productive use of such idle time. Today, many work environments are busy and active, and leisure time for personal development, personal interests, family, and the like is at a premium. The number of sources of information is increasing, and demands on non-work time are many.

It is thus seen that a need exists for making the idle time of computers more productive for computer users by providing an apparatus that collects and displays selected images of subject matters of interest to the user. It is to the provision of such that the present invention is primarily directed.

SUMMARY OF THE INVENTION

The present invention in a preferred apparatus collects a series of image collections according to user-defined indicia of images to collect for display on a video terminal at a user-selected idle time and sequence. The apparatus comprises means for generating a set of indicia used to select and collect sets of image collections for subsequent display on a video terminal at a user-selected time and sequence; means for collecting sets of image collections based on the set of indicia; and means for displaying representative portions of each of the sets of image collections on the video terminal. Means are provided for display of the sets of image collections.

The method of the present invention displays on a video terminal a series of image collections that are collected in response to a user-defined indicia of images to collect. The steps of the method comprise (1) generating a set of indicia that are used to select and collect sets of image collections for subsequent display on a video terminal at a user-selected time and sequence; (2) collecting sets of image collections based on the set of indicia; and (3) displaying representative portions of each of the sets of image collections on the video terminal during idle time of the computer. The method further includes the step of displaying sets of the image collections.

DETAILED DESCRIPTION

Figure 1:
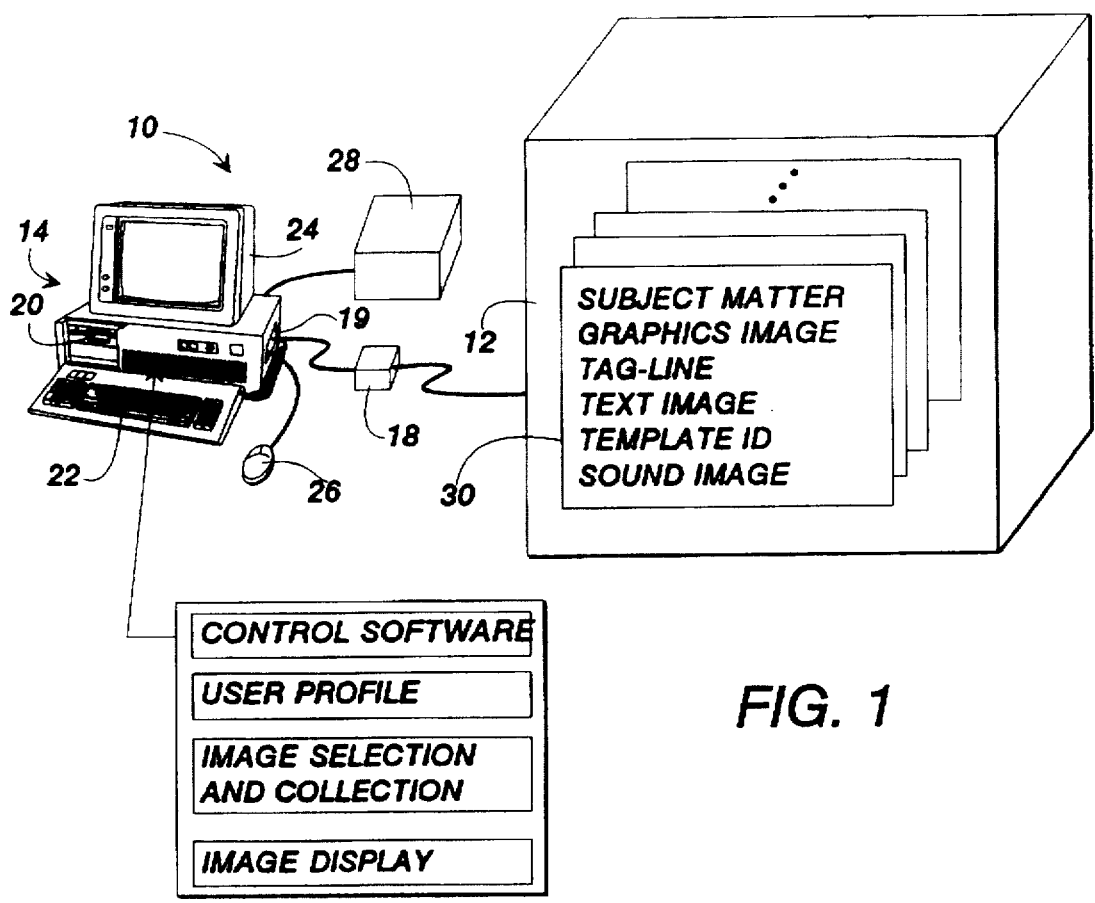
FIG. 1 is a block diagram of the architecture of the image selection, collection, and display apparatus of the present invention.

Referring now in more detail to the drawings, in which like numerals indicate like parts throughout the several views, FIG. 1 illustrates in block diagram form the architecture of a preferred embodiment of an image selection, collection, and display apparatus 10 of the present invention. The apparatus comprises at least one library 12 having collections of images and at least one computer 14 such as a commercially available personal computer operable by a user to access the library. In the illustrated embodiment, the computer 14 is remotely located from the library 12. The computer 14 communicates with the library 12 through a communications device 18, such as a modem. The computer 14 comprises a hard disk 19 and a microprocessor unit 20 that connects to input/output devices, including a keyboard 22, a video display terminal 24, a signalling device such as a mouse 26, and a printing device 28, which communicate conventionally with the microprocessor 20. The microprocessor 20 operates the image selection, collection, and display software represented graphically as block 29.

The library 12 includes a plurality of image collections 30 maintained and updated by librarians. Each image collection is directed to a particular topic. A directory lists the names or topics of the images available for collection. The term "images" as used herein refers to graphic images such as drawings or photographic-type representations, to text, to sounds associated with the graphics or text, and to combinations of graphic images, text, and sound.

Figure 2:
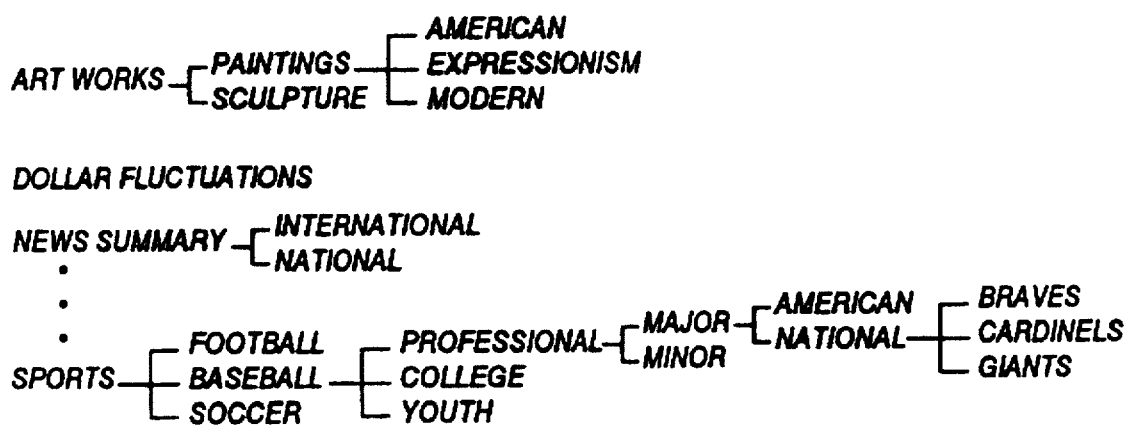
FIG. 2 is a representative portion of a tree-style hierarchy of subject matters for which images can be collected and displayed.

The directory provides an index to the images. As illustrated in FIG. 2, the directory comprises a hierarchy tree structure 34 of topics which can be selected for image collection. The topics become narrower in scope along the branches of the tree, which can be searched alphabetically or sequentially. In a preferred embodiment, the library 12 comprises a part of an electronic complex having a computerized database of image collections and directories. The database is part of an on-line interactive information source which is accessible by a user of the computer 14 through the modem. In an alternate embodiment, the library 12 comprises a database local to the computer 14, such as a compact disk read only memory device that receives and communicates with a compact disk of information, including graphic images databases, encyclopedias, and the like.

The user creates a personal user profile through control software 36. The user profile defines the specific and particular subject matters of interest to the user. These subject matters are selected from the names of the topics listed in the directory of the library 12. The user profile is readily changed for deleting subject matters, adding subject matters, or modifying the user preferences for the display of the collected images, as discussed below.

The subject matter collections 30 in the library 12 are periodically updated by librarians with new graphic and text data. In the preferred embodiment, the updates occur daily, for example, current political, economic, and sports information. Each of the images collections comprise graphics images, tag-lines, texts, template identifiers, and sounds. The graphics images are still, fixed images and motion video clips of still images in sequence. The tag-lines are a short text explanatory statements associated with each graphics images. The texts are more detailed news-story style explanations of the subject matters; for example, a sports report about a particular game illustrated in the graphics image. The template identifier is a code that refers to a print template to be used if the user selects to print a hard copy of the collected image. Sounds, such as quotes from an individual shown in the graphics image, may be part of the collected images for playing during display of the graphics or text images.

After the user profile is established and saved to the disk 19, the image collection control software 38 accesses the library 12 and selects images from the library for collection. The user profile contains the names of the selected subject matters of interest to the user. These names comprise a set of user-defined indicia of images to collect. The image collection process uses each listed subject matter as a criteria and collects from the library the images available for those subject matters. The images are transferred to the local data storage device such as hard disk 19 operatively communicating with the computer 14. In a preferred embodiment, the library 12 is accessed automatically at a predetermined time. Means are provided for the user to selectively require the control software to access the library 12 for the updated images.

Figure 3:
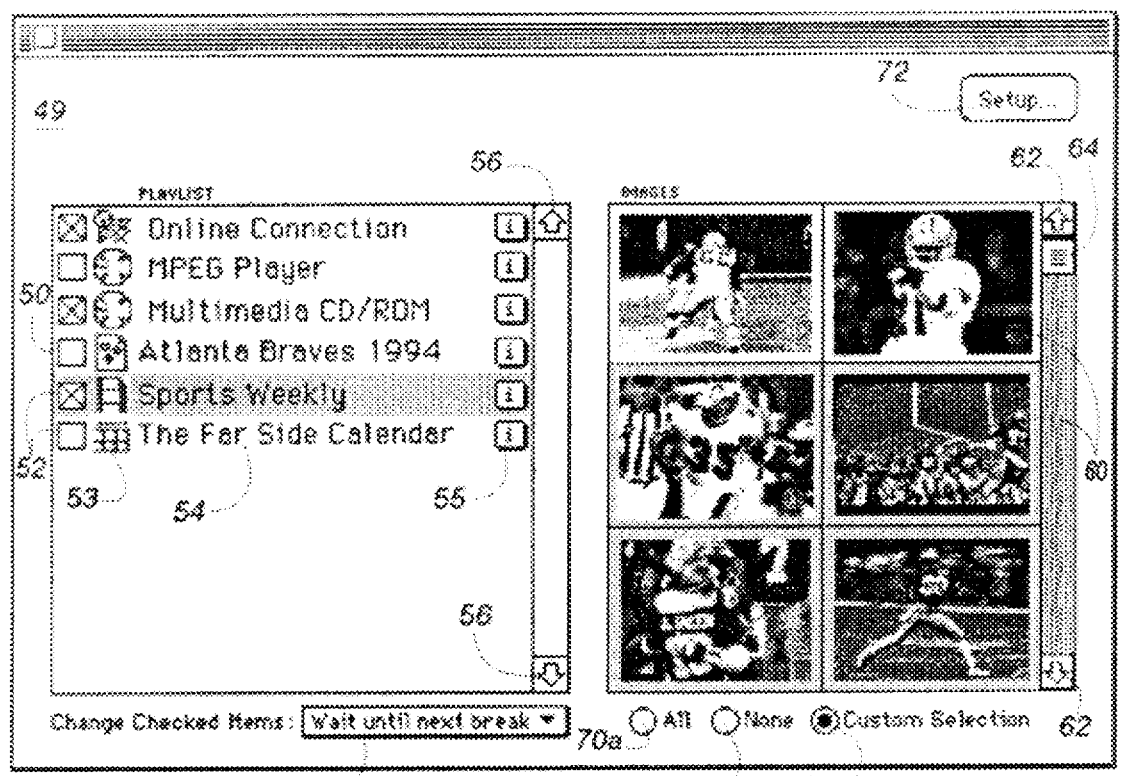
FIG. 3 is a user profile showing a playlist of subject matters for selection, collection, and display of images.

Subsequently, the user uses the computer 14 for work activities, such as executing word processing programs, graphic drawing programs, engineering programs, and the like. During use of the computer 14, the user may become involved with other matters, such as a telephone call or study, and not interact with the computer through the keyboard 22 or the mouse 26, and thereby leave the computer idle. After a predetermined period of idleness, the display control software 40 becomes active. The collected images are presented on the video terminal 24 in accordance with occurrence and timing criteria as selected by the user and maintained in the user profile. Should the user then return to working with the computer again, the display control software 40 becomes inactive until activated again. The display control software may also become active in response to a command entered to the computer by the user, as discussed below. During active display of the collected images, the user may selectively direct the display software to execute other display functions, including display of text associated with the graphics images and printing a copy of the collected image. Control Software-User Profile Control software 36 is provided for a user to define image collection indicia that reflects the interests of the user. The indicia is subsequently used for the selection and collection of images. The indicia is maintained in a user profile. Each user creates a profile that details the specific subject matters and interests for collection of images. For example, the user profile can define the images to collect to include a certain college football team, business news, weather information, political news, daily cartoons, and the like. The profile accordingly defines the criteria for the images to be collected from the library 12. FIG. 3 is a representative screen 49 showing a user profile as displayed on the video terminal 24. The subject matters available for selection are listed in a playlist 50 that includes a select/non-select indicator 52, a subject matter icon 53 and definition 54 in text form, and an index button 55. If active, the button 55 permits accessing other related subject matters that are subsets of the parent subject matter. If the index button 55 is not active, images are available for collection for the particular named subject matter. In a preferred embodiment, the subject matters are grouped in a tree-style hierarchy, with branches to narrower subject matters, as discussed above. Directional arrows 56 allow scrolling of the subjects on the play list 50. The mouse operated cursor is positioned on the particular arrow 56 and actuated to cause the directory listing to scroll in the alphabetical listing to display subject matters 54 in the play list 50. Other mechanisms for presenting hierarchical structures are gainfully used with the present invention 10. FIG. 2 illustrates an example hierarchy tree structure that branches to narrower topics until the final narrow topics having image collections available for selection are listed. On the illustrated screen 49, the user has selected a connection to a commercial on-line information service, a multimedia CD/ROM player, and a sports weekly, as indicated by the X in the respective indicators 52. The subject matters 54 in the illustrated embodiment MPEG player, the Atlanta Braves 1994, and the subscription to the syndicated comic are not selected.

Figure 3A:
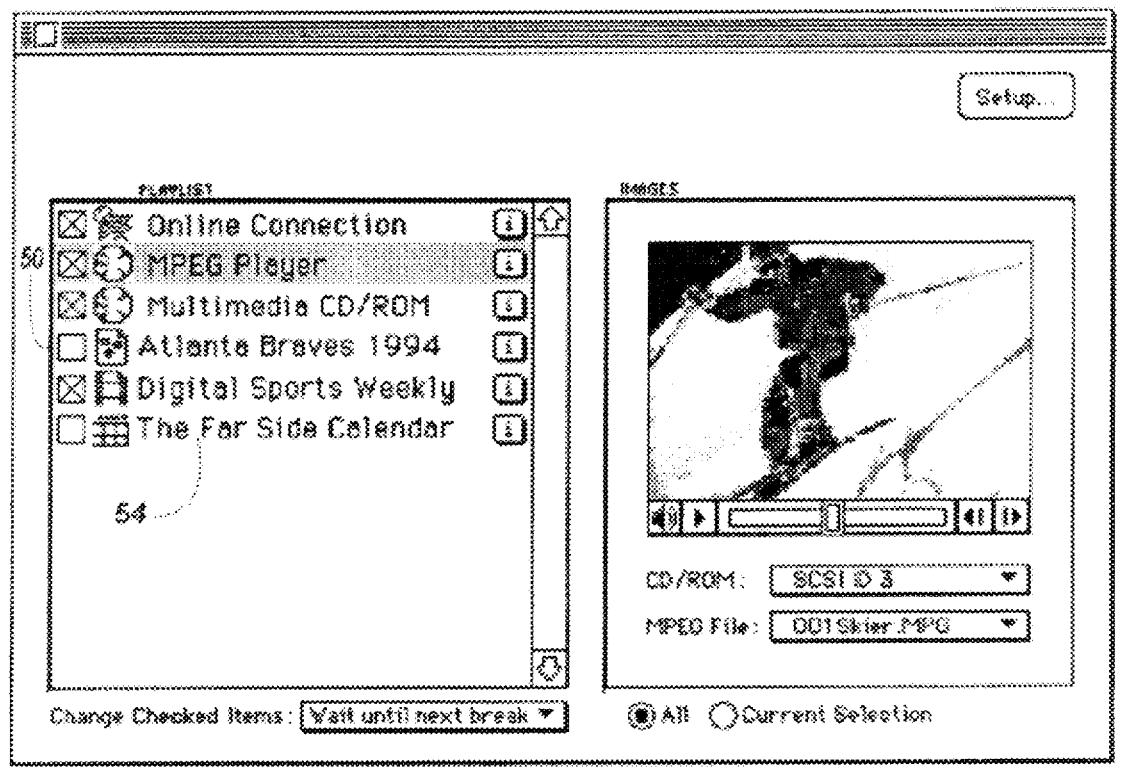
FIG. 3A illustrates an alternate embodiment of the user-profile shown in FIG. 3.

FIG. 3A illustrates an alternate embodiment of the user profile illustrating the use of graphics/text/sound display software for displaying motion video clips conventionally on the computer 14.

A graphics play list 58 displays discrete preview icons 60 or graphic images representative of the available image collections. The preview icons 60 can be still images or motion video clips comprising a sequence of separate still images. The illustrated icons 60 are images in the sports weekly subject matter 54. Directional arrows 62 allow scrolling of the preview icons 60 in the subject matters on the play list. The mouse-operated cursor is positioned on the particular arrow 62 and actuated to cause the display of other graphics icons in the play list. A positional indicator 64 shows the location of the displayed images relative the entire play list. The positional indicator 64 can be moved by mouse-control. The cursor is positioned on the indicator 64, the mouse actuated and moved with the indicator moving relatively. After the mouse is released, the window displays the preview icons 60 in the selected portion of the play list.

The graphics selection switches 70a, 70b, and 70c allow customizing the display of images in the collection. If all images are to be displayed during idle time, switch 70a is activated. This is a default mode. If none of the images 60 are to be displayed, switch 70b is activated. The user can also "deselect" graphic images if only a portion of the graphics images are to be displayed. The user first activates switch 70a. This highlights all of the graphics images 60 with a colored border. The user then deselects for display those images which are not be displayed. This is accomplished by moving the mouse cursor within the border of the particular graphics image 60 to deselect. Actuating the mouse deselects the image, the colored border is re-painted on the screen, and the deselected image is excluded from the idle time display discussed below. The switch 70c automatically activates to indicate custom selection. For example, a user may want to exclude images of certain sports which are not of interest.

A display-when button 71 defines how long a period occurs before the display control software switches from displaying the image of one subject matter 54 selected in the play list to the next. Changes can be implemented after a set period of time or after the next idle-time display mode occurs.

A setup button 72 accesses the configuration setup screens which set the parameters for the operation of the image selection, collection, and display apparatus discussed herein. With reference to FIGS. 4A–4D, the user interacts with the microprocessor 20 through the keyboard 22 and mouse 26 to configure the operation of the apparatus 10 for the selection, collection, and display of images for the selected 52 subject matters 54 in the play list 49, according to the present invention. Tabs 79 are activated by mouse cursor operation in order to select the desired configuration screen. The setup configuration screens include general controls (FIG. 4A), collections controls (FIG. 4B), password controls (FIG. 4C), and connectivity controls (FIG. 4D). The setup configuration screen illustrated in FIG. 4A includes a time window 80 in which the user selects the amount of idle-time to occur before the image display software 40 begins to display the collected images. A pop-up menu 81 defines the units of time. A shuffle mode can be selected with an on/off toggle switch 82 for random display of the series of image collections or sequential display of the series of image collections according to the playlist sequence. The microprocessor 20 can be instructed to enter a "sleep" mode in which the idle-time display commences. A sleep-now hotkey can be selected with a toggle switch 84 and the hotkey defined by the user. A "hotkey" implements the selected activity upon input from the keyboard 22 to the microprocessor 20. The hotkey for immediate activation of the idle time made (i.e. "computer sleep") in the illustrated embodiment is the simultaneous key stroke of the command key, the control key, and the space bar on the keyboard 22. A toggle switch 86 permits movement of the mouse 26 to awaken the microprocessor 20, i.e., stop the idle-time display of the collected images. The image collections may also include sounds. Several toggle switches 88, 90, and 92 control the sound during idle-time display of images. The switch 88, when selected, mutes the sound for all playlist items during idle-time display. The switch 90 provides a mute sound hotkey for selective muting during idle-time display of the collection of graphic images. The mute hotkey toggles the configuration between sound-on and -off during idle-time display. The user may define a mute hotkey, which in the illustrated embodiment is a combination of the command, control, and "M" keys. The switch 92 provides muting after the first display of each of the collected images. If switch 92 is on, the sound image associated with the graphics or text is played for the first occurrence display of the image collection. For subsequent displays during idle-time, the sound image is mute. A sleep-corner mode can be selected with a switch 94. In this mode, positioning the mouse 26 such the cursor on the screen is in a selected corner causes the microprocessor 20 to enter the idle-time sleep mode with display of the collected images. Alternatively, the corner can be set for "never-sleep" 96 so that positioning the cursor in the corner activates a stop switch which prevents the idle mode displays.

Figure 4A:
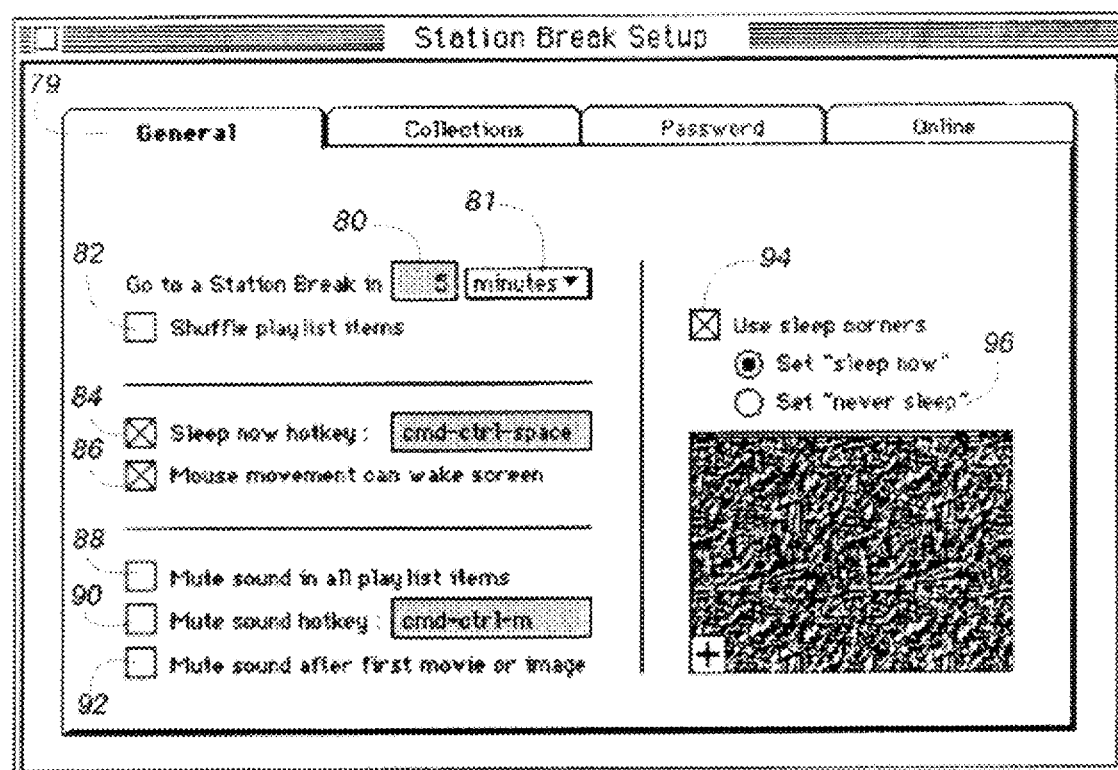
FIG. 4A–4D are a sequence of interface screens for configuring the collection and display apparatus of the present invention.
Figure 4B:
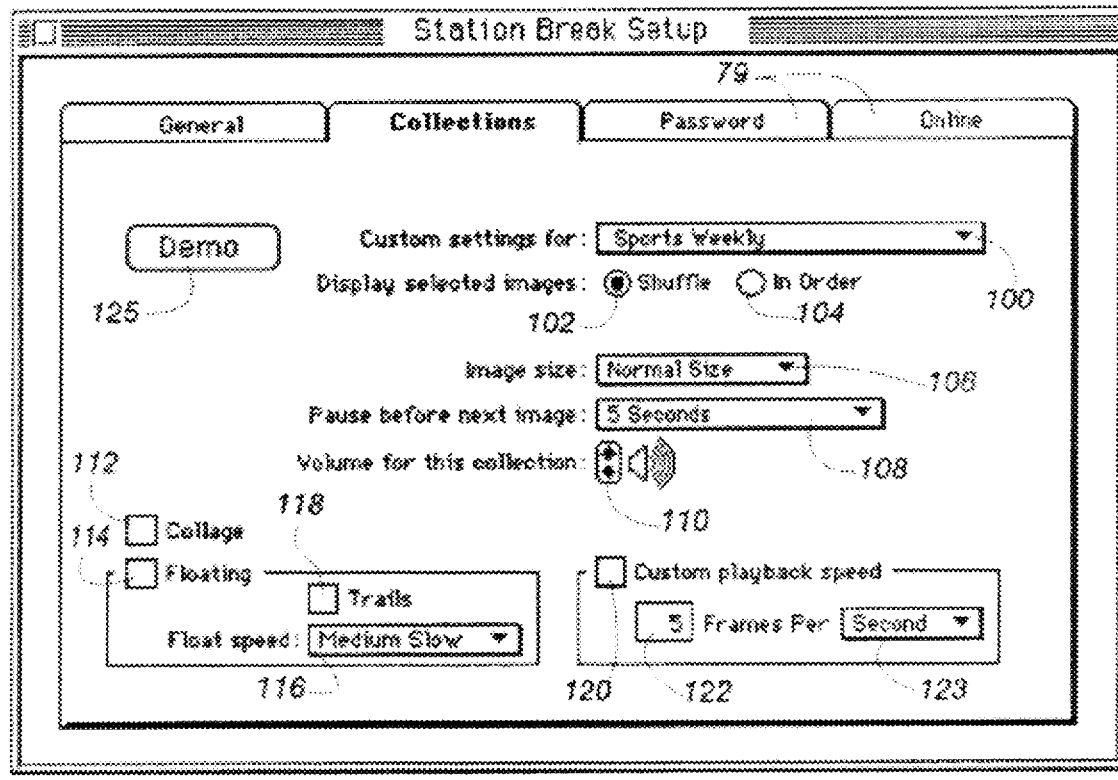

FIG. 4B illustrates a configuration screen for the image collections. Each of the image collections can be independently configured for display during the idle-time mode. A pop-up window 100 lists the selected 52 subject matters 54 for image collection. Activating the mouse cursor within the window 100 causes the window to become larger, showing the text names 54 of the selected subject matters. The particular subject matter 54 to be configured is then picked by moving the mouse curser and releasing the mouse. A pair of toggle switches 102 and 104 control the display of the graphics images, for shuffle or sequence display during idle-time of the images for the selected subject matter in the collection. The user controls the size of the displayed image with a selection made in a size window 106. A pause window 108 sets the amount of time the screen is blank between the end of the display of one graphics image in the collection and the display of the next image. A slide switch 110 can be moved up and down with the mouse cursor to increase or decrease the volume of the sound images played with the graphics image.

The display of the graphics image on the screen can be varied to provide a collage effect by activating a collage switch 112. A switch 114 provides for floating the graphics image around the screen. A pop-up window 116 is accessed with the mouse and cursor to adjust the float speed. A trails switch 118 is activated to cause previous graphics images to remain on the screen and slowly fade away. The fading images provide a trailing effect for the graphics image floated to a new position on the screen.

Graphic images comprising video clips are made of a series of still videos. The rate of playback for the video clips is adjusted by selecting button 120 for customizing the playback speed. Through keyboard and mouse inputs, the number of frames and time are adjusted in the frames pop-up windows 122 and 123. A demonstration button 125 provides a brief representative illustration of the types of images which can be collected for the selected 52 subject matters 54.

Figure 4C:
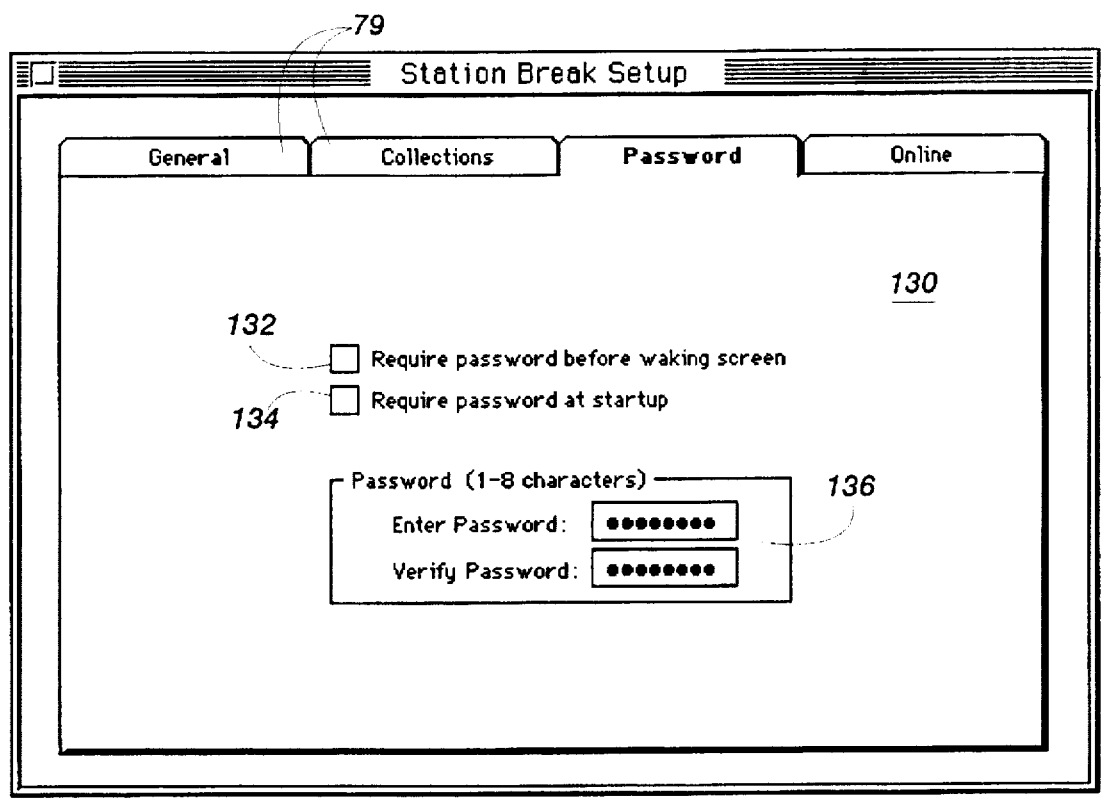
Figure 4D:
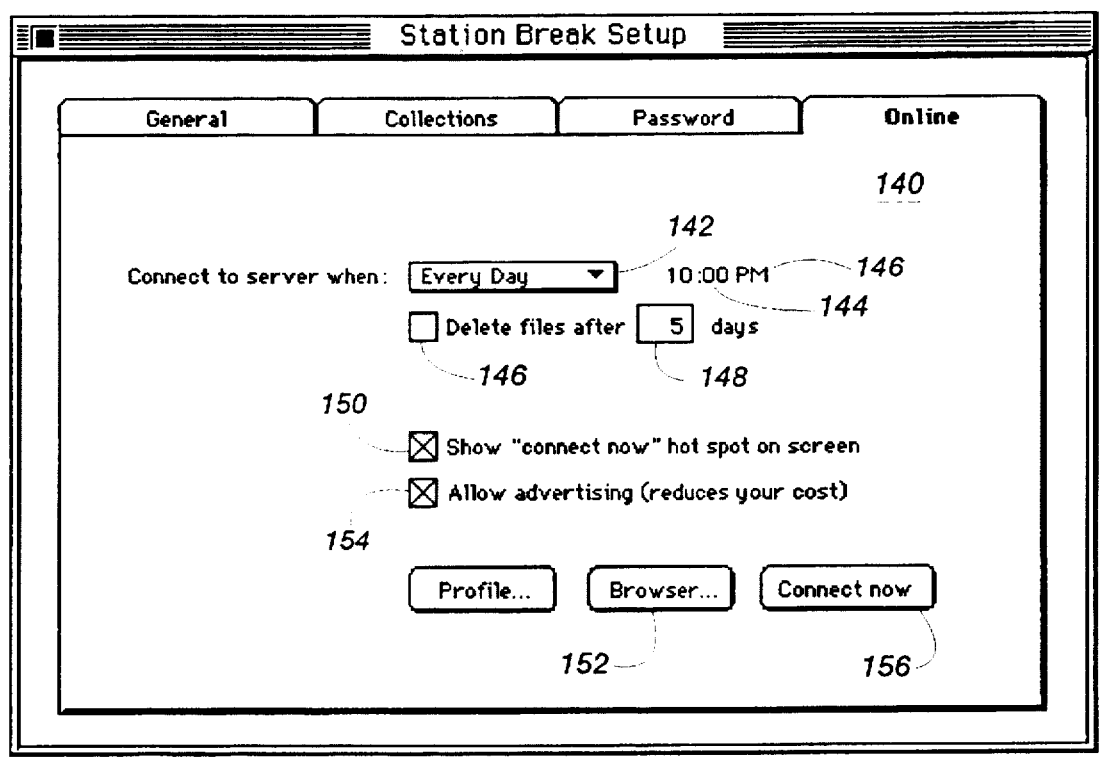

FIG. 4C illustrates a screen 130 providing access to password control of the operation of the apparatus 10. By activating a button 132 and a button 134, a password is required to wake the screen from its idle-time display and to require the password at startup, respectively. A set password window 136 is activated by the mouse 26 and cursor to set or change the password for controlling access to the apparatus 10. If a password is enabled, the password must be entered in order to disable the password.

FIG. 4D illustrates a connectivity screen 140 for setting the time for the microprocessor 20 to access the library 12 to update the images for the selected 52 subject matters 54. A connection occurrence window 142 defines the frequency with which the apparatus 10 automatically accesses the library 12 to obtain updated images for the selected 52 subject matters 54. A clock 144 defines the time for the automatic update on the selected days. The clock 144 is accessed by mouse and cursor. Arrow buttons (not illustrated) allow setting the time, and a day/night indicator 146 toggles between the indicators AM and PM.

Downloaded images files occupy large amounts of storage, even with compression routines. Downloaded files are deleted either automatically by the apparatus 10 or manually by the user. An automatic deletion switch 148 is selected with a period window 150 indicating the age of the file before deletion.

A "connect now" switch 150 selectively displays a button on the idle time image display. Activating the button 150 with the mouse and cursor causes the apparatus 10 to open or "launch" a connection with conventional on-line browsing software, such as that used to access commercial information networking systems. A browser button 152 also launches the on-line software directly from the connection window which facilitates connecting to commercial information networks.

In the illustrated embodiment, activating an advertising accept switch 154 allows the apparatus 10 to automatically download commercial advertising for display with the selected and collected images. A connect-now button 156 instructs the control software 38 to update the selected 52 subject matters 54 by accessing the library 12 for images.

A profile define button 158 opens a screen (not illustrated) containing the directory of the library 12. As discussed above, the directory is a tree-style hierarchy of the topics or subject matters 54 having images available for selection, collection, and display. Using keyboard 22 strokes and/or the mouse 26 device, the user selects the subject matters of personal interest for the image collections. The parent subject matter can be selected or the user can select a more narrow branch or sub-set subject matter. The directory of the library 12 is displayed in a scrollable window with directional arrows for moving through the list of subjects. Sub-directory buttons associated with each subject listed in the directory permit the user to follow sub-divisions of general categories to more narrow and specific subject matters associated with the particular general subject matter.

Control Software-Image Selection and Collection

At the predetermined time set in the connectivity screen (FIG. 4D), the microprocessor 20 automatically accesses the library 12. In a preferred embodiment, the library 12 is an on-line information service accessed through the modem communications device. The control software 38 uses the selected 52 subject matters 54 in the user profile 50 as criteria for selecting and collecting images from the library 12. In the illustrated embodiment, this is accomplished by matching the subject matters 54 with the file names in the library 12.

The collected images are transferred from the library 12 to the hard disk 19 of the computer 14. Preferably, the collected images are sent as a single package of data. This minimizes the on-line connect time associated with accessing such services by modem. After downloading the package, the control software 38 breaks the package apart into the separate series of image collections according to the selected 52 subject matters 54 in the play list 50. The separated series of image collections are then available for display by the image display control software 40.

A log is maintained of the downloaded collections of images. The log includes the subject matters 54, the date, and the time of collection. The control software compares the log with the images then-available in the library 12 for collection. Images previously collected are not recollected for downloading.

Control Software-Image Display

Figure 7A:
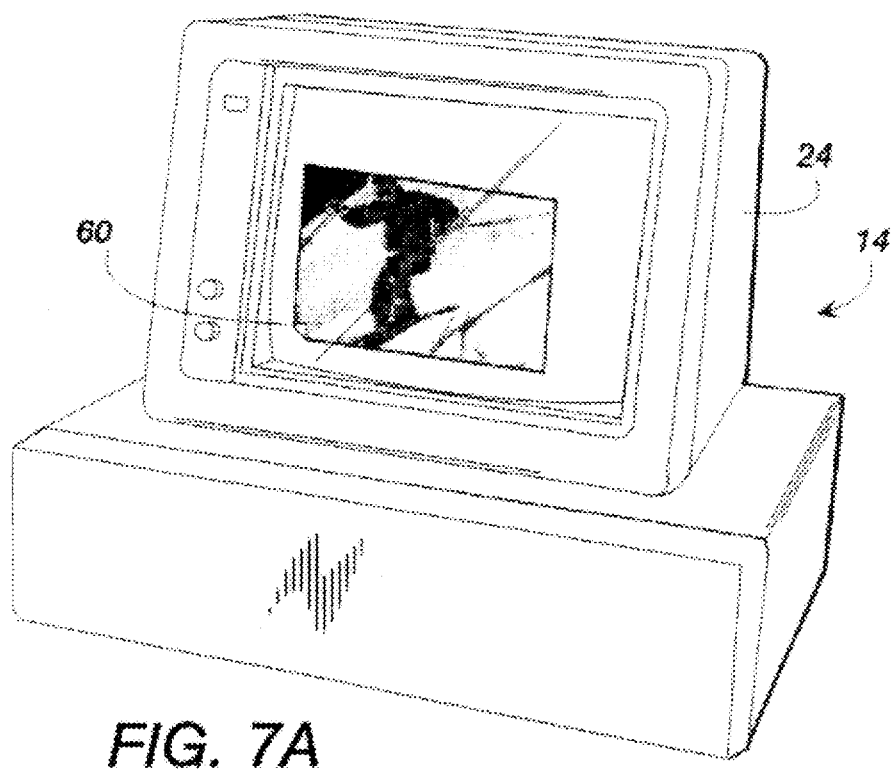
FIG. 7A is a perspective view of a computer video terminal displaying, during idle time of the computer, a representative graphics image of the image collection shown in FIG. 3A.
Figure 7B:
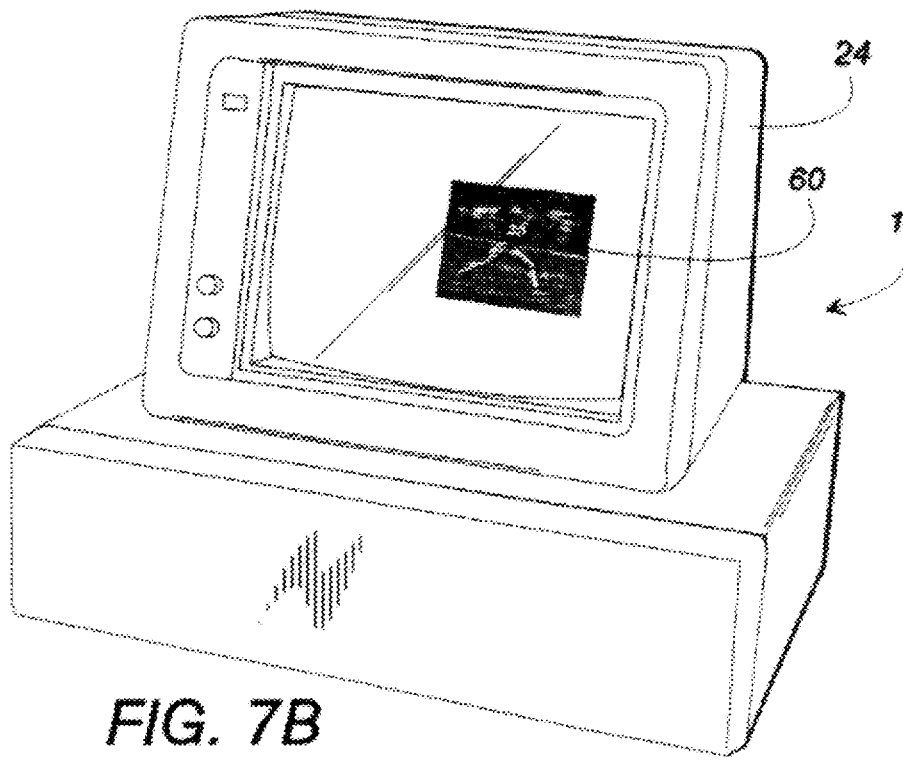
FIG. 7B is a perspective view of a computer video terminal displaying, during idle time of the computer, a representative graphics image of an image collection shown in FIG. 3.

The display control software 40 monitors the operation of the microprocessor 20. As the user works, there will be periods of idle computer time as other matters occupy the attention of the user. Idle computer time means periods during which no commands are entered to the computer for actions to be accomplished. The image display software 40 monitors the activity on the serial input/output ports for keyboard 22 and mouse 26 inputs and printer 28 outputs. After the predetermined period of computer idleness (no activity on the serial ports), the display software 40 dims the screen and begins to display the image collections selected and collected previously. For example, FIG. 7A shows a representative graphics image from the "MPEG Player" image collection illustrated in FIG. 3A, being displayed on the video terminal 24 during the idle time of the computer. After the preselected display period, another representative image is displayed on the video terminal 24, for example, such as one of the images 60 from the "Sports Weekly" image collection illustrated in FIG. 3.

The display of the image collections can be interrupted so that the user can return to working with the computer 14. This is accomplished in the preferred embodiment by moving the mouse 26 or touching a keyboard 22 key to enter a signal to the microprocessor 20. The computer then returns to the activity it was processing at the time the control software 40 interrupted and began displaying the image collections.

Figure 5:
FIG. 5 illustrates a magazine-style display of an image collection according to the present invention.

The user may want to see additional information about a graphics image being displayed on the terminal 24 during idle time. A selected keyboard key can be defined by the user as a hotkey switch for directing the display control software to perform selected functions. One such function is to display in a magazine-style format the graphic image and its associated text, as illustrated in FIG. 5. The graphics image 50 is displayed with its associated tagline 160 that functions as a brief description of the graphics image. A header 162 is positioned over the graphics image 60 to identify the source subject matter 54 of the images. A text window 164 displays the associated text 166 for the graphics image 60. The text window 164 includes directional arrows 168 for scrolling through the text image. A close button 169 causes the control software 40 to end the display of the images and return the display on the video terminal to the previous graphic, for example, to the control window from which the image was selected.

Figure 6:
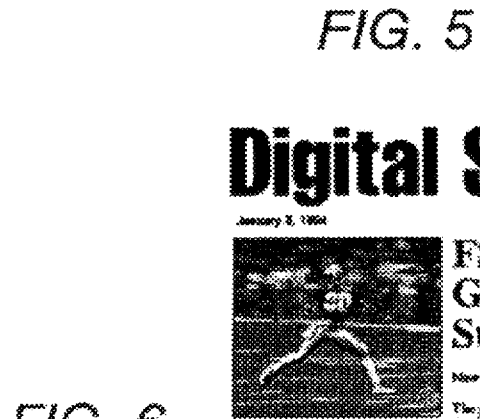
FIG. 6 illustrates a template-controlled print of an image collection according to the present invention.

The user can selectively create a printed report of the current displayed image. A template defines the graphics and text spaces for receiving the graphics data and the text data which are communicated to the printer 28. FIG. 6 illustrates a printed report 170 of a sports related image. A header 172 on the report 170 includes date information available from the operating system of the computer 14. The report 170 includes a headline 176, the graphics image 60 in a pre-defined space, the tag-line 178 which is associated with the graphics image 60, and the text image 180 which fills in the pre-defined text space in the template. A footer 182 includes a page number and subject matter description. A banner 184 identifies the subject matter 54 of the images.

As discussed above, each image in the collection includes a template identifier. The templates are stored on the hard disk 19 of the computer 14 and accessed for printing upon user command. The templates vary, depending on the subject matter to be printed in the template, and are readily reused. The templates provide a magazine-style presentation of the collected images.

The following provides an example of the use of the present invention. A user creates a user profile listing subject matters of interest to the user for image collections as a) daily updates of Associated Press photos and news items; b) current weather map (national); c) video clip of yesterday's top "play of the day" in sports; d) a popular syndicated comic strip subscription; e) celebrity calendar. Subsequently, the image selection and collection control software automatically accesses the library at a predetermined time to receive the updated images for the user-selected subject matters. Typically, the library is accessed during early-morning hours, in order that the librarians can update the library with the news. In an alternate embodiment, the user can selectively require the image selection and collection software to access the library for updated information. The selection control software retrieves datafiles of images that correlate to the definitions in the user profile. The datafiles of images are grouped into a package which is transferred to the computer's hard disk.

Subsequently the user of the computer is otherwise occupied and the control software operating in the background of the computer determines that the computer is idle. This is accomplished by monitoring the activity of the serial input and output buses of the computer. In the absence of keyboard or mouse input or printer output for a period of time, the control software determines that the computer is idle. After the predetermined period of idleness, the display control software begins displaying the series of collected images as set forth in the user profile. An image of the President appears and fades to black after the predetermined display period as set forth in the user profile. The weather map is displayed, and the screen fades the black. A video clip of an exciting basketball play is then displayed, and repeated during the display period, before the screen fades to black. The selected cartoon is then displayed.

The user looks at the cartoon and decides to create a print. The print hotkey is pressed. In a preferred embodiment, the print hotkey is predefined and not changeable by the user. The control software responds by changing the idle time display to the magazine page format. The user may then return to his other activity. The print is made with the graphics and text images inserted into appropriate defined spaces according to the cartoon template. After a predetermined period, the magazine page fades to black and the control software returns to its idle-time display mode. The next image in the series is displayed and after the predetermined time, the screen fades to black. The sequence of selected images is then repeated during that idle time or subsequent idle times during the day.

This process is repeated, with the image selection and collection software again accessing the library to gather images updated in the categories defined in the user profile for display the following day. At the defined time, the control software again accesses the library for updated images. The user can however selectively require the control software to obtain updated images on demand by entering the update-now hotkey. This enables the user to obtain updates, if any, on rapidly changing news item.

While the present invention has been described with respect to a library 12 that serves a wide area network of remotely located computers 14 and for a local individual computer, the present invention would also be applied in a local area network, such as a on-line interactive database on a server computer as part of a corporate information system. The managers of the database and the server computer also maintain the local area network library. Corporate-related topics would be available on the library for selection by users on the network. These topics include daily stock price, a daily tip on using particular computer software, corporate news, and the like.

In an embodiment for a local individual computer, a service bureau distributes periodically to subscribers a high capacity disk, such as a CD-ROM disk, containing image collections for access by the control software of the present invention. The CD-ROM device provides a high speed, local database for a library of images to be selected and collected for display as described above.

While the apparatus of the present invention has been disclosed for accessing libraries of images for specific subject matters, the text name 54 of the subject matters can also be used to access on-line national weekly magazines or other databases. Control software uses the text name 54 as keyword in context searching of these magazines or databases for articles containing the keywords or text names 54.

The display control software is also accessible from the play list screen illustrated in FIG. 3. Each individual graphic image 60 is selectively accessible by commanding the control software to display the collected image, by double-clicking the mouse within the particular graphic image. In response, the control software displays the selective image in a separate multimedia window such as that shown in FIG. 5.

The foregoing has disclosed an improved image collecting and displaying device apparatus and method for use with microprocessors and other interactive computerized apparatus. It should be understood that the above described embodiments merely illustrate principles of the invention in preferred forms. Many modifications, additions, and deletions may, of course, be made thereto without departure from the spirit and scope of the invention as set forth in the following claims.

What is claimed is:

1. An apparatus for displaying images during idle time of a personal computer, comprising:

means for generating a set of user-defined indicia of images comprising audio, graphics, or text, to collect from a selected database of a plurality of image collections for creating individualized selected sets of image collections of interest to a user of a personal computer for subsequent display of the graphics or text images on a video terminal of said personal computer or display of audio images by communicating sound from said personal computer during idle time as defined by said user of said personal computer;

means for collecting said sets of image collections based on said set of user-defined indicia of images to collect, said collecting of said sets of image collections occurring automatically at user-specified instances whereby said sets of image collections are communicated from said database of image collections to said personal computer of the user;

means for displaying repeatedly in a sequence of images, representative portions of said sets of image collections during said idle time of said personal computer; and means for displaying upon user selection during display of one of said representative portions the one of the sets of image collections corresponding to said one representative portion.

2. The apparatus as recited in claim 1, wherein said means for display includes means for defining the occurrence of display of the sets of image collections.

3. The apparatus as recited in claim 1, wherein said means for display includes means for defining the sequence of display of the sets of image collections.

4. The apparatus as recited in claim 1, further comprising means for selectively displaying a representative portion of a selected one of the sets of image collections.

5. The apparatus as recited in claim 1, further comprising means for automatically initiating the collection of sets of image collections.

6. The apparatus as recited in claim 1, further comprising means for selectively initiating the collection of sets of image collections.

7. The apparatus as recited in claim 1, wherein the means for collecting accesses a library of image collections for selecting therefrom.

8. The apparatus as recited in claim 7, wherein the library is an on-line information source.

9. The apparatus as recited in claim 7, wherein the library is a high capacity disk-based database.

10. The apparatus as recited in claim 7, wherein the library is a database maintained on a local area network for communication with a plurality of microprocessors.

11. A method for displaying images during idle time of a personal computer, comprising the steps of:

(a) generating a set of user-defined indicia of images comprising audio, graphics, or text, to collect from a selected database of a plurality of image collections for creating individualized selected sets of image collections of interest to a user of a personal computer for subsequent display of the graphics or text images on a video terminal of said personal computer or display of audio images by communicating sound from said personal computer during idle time as defined by said user of said personal computer;

(b) collecting said sets of image collections based on said set of user-defined indicia of images to collect, said collecting of said sets of image collections occurring automatically at user-specified instances whereby said sets of image collections are communicated from said database of image collections to said personal computer of the user;

(c) displaying repeatedly in a sequence of images, representative portions of said sets of image collections during said idle time of said personal computer; and (d) selecting by said user for display on said video terminal a one of said sets of image collections corresponding to said displayed representative portion of said one of said sets of image collections displayed in sequence during said idle time.

12. The method as recited in claim 11, further comprising the step of selecting the occurrence of the display of the sets of image collections.

13. The method as recited in claim 11, further comprising the step of selecting the sequence of display of the sets of image collections.

14. The method as recited in claim 11, further the step of selectively displaying a representative portion of a selected one of the sets of image collections.

15. The method as recited in claim 11, wherein the step of collecting is initiated automatically on a predetermined period.

16. The method as recited in claim 11, wherein the step of collecting is initiated selectively by the user.

17. An apparatus for collecting a series of image collections for display on a microprocessor device at a user-selected time and sequence, the series of image collections selected according to a user-defined indicia of images to collect, comprising:

an electronic complex having a database of image collections comprising audio, graphics, or text images and an associated directory listing an identifier for each image collection;

at least one microprocessor device operative for selecting, collecting, and displaying image collections according to a set of user-defined indicia for selecting image collections to copy from the database for subsequent display of the graphics or text images on a video terminal or the audio images on a speaker of the microprocessor device at the user-selected idle time and sequence;

an access device for communicating the directory and the selected image collections from the database to the microprocessor device;

means associated with said microprocessor device for generating a set of indicia used to create sets of image collections for subsequent display of the graphics or text image on a video terminal or the audio image on the speaker of the microprocessor device at a user-selected idle time and sequence;

means associated with said microprocessor device for collecting sets of image collections based on the set of indicia;

means associated with said microprocessor device for displaying during the idle time as defined by the user representative portions of each of the sets of image collections; and means associated with said microprocessor device responsive to a user-generated demand for displaying on the video terminal or by the speaker a selected one of the sets of image collections corresponding to one of said representative portions.

18. The apparatus as recited in claim 17, wherein the electronic complex comprises an on-line information source.

19. The apparatus as recited in claim 17, wherein the electronic complex comprises a high capacity disk-based database.

20. The apparatus as recited in claim 17, wherein the electronic complex comprises a local area network and server.

21. The apparatus as recited in claim 17, wherein said means for display includes means for defining the occurrence of display of the sets of image collections.

22. The apparatus as recited in claim 17, further comprising means for selectively displaying a representative portion of a selected one of the sets of image collections.

23. The apparatus as recited in claim 17, further comprising means for automatically initiating the collection of sets of image collections.

24. The apparatus as recited in claim 17, further comprising means for selectively initiating the collection of sets of image collections.

* * * * *